US008204036B2

(12) United States Patent
Russell et al.

(10) Patent No.: US 8,204,036 B2
(45) Date of Patent: Jun. 19, 2012

(54) METHOD AND APPARATUS FOR COEXISTENCE

(75) Inventors: Michael E. Russell, Palatine, IL (US); Arnold Sheynman, Northbrook, IL (US); Paul F. Struhsaker, Austin, TX (US); James A. Van Bosch, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1419 days.

(21) Appl. No.: 11/680,067

(22) Filed: Feb. 28, 2007

(65) Prior Publication Data
US 2008/0205365 A1 Aug. 28, 2008

(51) Int. Cl.
H04J 3/06 (2006.01)
H04L 12/413 (2006.01)

(52) U.S. Cl. ........................................ 370/350; 455/448

(58) Field of Classification Search .................. 370/330, 370/328, 336, 350, 329, 338, 343, 344, 480; 455/448, 452.2, 69, 436–444; 709/227
See application file for complete search history.

(56) References Cited

U.S. PATENT DOCUMENTS

| | | | |
|---|---|---|---|
| 6,329,944 B1 | 12/2001 | Richardson et al. | |
| 7,095,754 B2 | 8/2006 | Benveniste | |
| 7,099,671 B2 | 8/2006 | Liang | |
| 7,117,008 B2 | 10/2006 | Bajikar | |
| 7,133,398 B2 | 11/2006 | Allen et al. | |
| 7,146,133 B2 | 12/2006 | Bahl et al. | |

(Continued)

FOREIGN PATENT DOCUMENTS
EP 1 119 137 * 1/2000
(Continued)

OTHER PUBLICATIONS

IEEE; "Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands, and Corrigendum 1"; IEEE Std 802.16e-2005 and IEEE Std 802.16-2005/Cor1-2005; Feb. 28, 2006; pp. 357-358; New York, New York, USA.

(Continued)

Primary Examiner — Michael Faragalla
(74) Attorney, Agent, or Firm — Sylvia Chen

(57) ABSTRACT

A method for coexistence of an orthogonal frequency division multiple access (OFDMA) receiver (117) such as a WiMAX receiver with a synchronous frame-based transmitter (115) such as a Bluetooth transmitter within a mobile station (110) receives an estimated media access protocol (MAP') signal indicating when a MAP message is expected to be received by the OFDMA receiver (117) and uses it at a Bluetooth shutdown signal (190) at least when a MAP message is expected to be received. The MAP' signal can be taken directly from the ODFMA transceiver (117) or it may be produced through analysis of a receiver-enable (RXE) signal that includes not only MAP symbols but also downlink data symbols. The RXE signal can be analyzed using interrupt-and-timer, Fast Fourier Transform, covariance, and/or delay-locked loop techniques to extract historical MAP symbol information and generate expected MAP symbol information. Shutting down a Bluetooth transmitter during expected MAP message receipt permits the OFDMA receiver to maintain synchronicity with an access point while not requiring the Bluetooth transmitter to shut down every time the OFDMA receiver expects to receive an OFDMA symbol.

20 Claims, 13 Drawing Sheets

U.S. PATENT DOCUMENTS

| | | | |
|---|---|---|---|
| 7,542,728 | B2 | 6/2009 | Bitran et al. |
| 7,545,787 | B2 * | 6/2009 | Bitran et al. ............... 370/338 |
| 2003/0169697 | A1 | 9/2003 | Suzuki et al. |
| 2004/0162106 | A1 | 8/2004 | Monroe et al. |
| 2004/0242159 | A1 | 12/2004 | Calderon et al. |
| 2005/0025174 | A1 | 2/2005 | Fischer et al. |
| 2005/0059347 | A1 | 3/2005 | Haartsen |
| 2005/0246754 | A1 * | 11/2005 | Desai et al. ............... 725/118 |
| 2005/0286476 | A1 | 12/2005 | Crosswy et al. |
| 2006/0205401 | A1 | 9/2006 | Palin et al. |
| 2006/0215601 | A1 | 9/2006 | Vleugels et al. |
| 2006/0221917 | A1 | 10/2006 | McRae |
| 2006/0239223 | A1 | 10/2006 | Sherman et al. |
| 2006/0246932 | A1 | 11/2006 | Liang |
| 2006/0252418 | A1 | 11/2006 | Quinn et al. |
| 2006/0281436 | A1 | 12/2006 | Kim et al. |
| 2006/0292987 | A1 | 12/2006 | Ophir et al. |
| 2007/0066314 | A1 | 3/2007 | Sherman et al. |
| 2007/0124478 | A1 | 5/2007 | Abdelhamid et al. |
| 2007/0135162 | A1 | 6/2007 | Banerjea et al. |
| 2007/0183383 | A1 | 8/2007 | Bitran et al. |
| 2007/0232358 | A1 | 10/2007 | Sherman |
| 2007/0275746 | A1 | 11/2007 | Bitran |
| 2008/0056193 | A1 | 3/2008 | Bourlas et al. |
| 2008/0101279 | A1 | 5/2008 | Russell et al. |
| 2008/0113692 | A1 | 5/2008 | Zhao et al. |
| 2008/0130620 | A1 | 6/2008 | Liu et al. |
| 2008/0130676 | A1 | 6/2008 | Liu et al. |
| 2008/0139212 | A1 | 6/2008 | Chen et al. |
| 2008/0144550 | A1 | 6/2008 | Makhlouf et al. |
| 2008/0146155 | A1 | 6/2008 | Makhlouf et al. |
| 2008/0146156 | A1 | 6/2008 | Makhlouf et al. |
| 2008/0146172 | A1 | 6/2008 | Makhlouf et al. |
| 2008/0205365 | A1 | 8/2008 | Russell et al. |
| 2008/0212542 | A1 | 9/2008 | Kung et al. |
| 2009/0004972 | A1 | 1/2009 | Wang et al. |
| 2009/0005111 | A1 | 1/2009 | Wang et al. |
| 2009/0034444 | A1 | 2/2009 | Wang et al. |
| 2009/0252137 | A1 | 10/2009 | Bitran et al. |

FOREIGN PATENT DOCUMENTS

| | | | |
|---|---|---|---|
| EP | 1119137 | A | 7/2001 |
| EP | 1729463 | B1 | 11/2009 |
| WO | 2006069352 | A1 | 6/2006 |
| WO | 2007002688 | A2 | 1/2007 |
| WO | WO 2007/002688 | * | 1/2007 |

OTHER PUBLICATIONS

Patent Cooperation Treaty; "Notification of Transmittal of the International Search Report and the Written Opinion of the International Searching Authority, or the Declaration" for International Application No. PCT/US2008/053555; Nov. 20, 2008; pp. 1-13.

Patent Cooperation Treaty; "Notification of Transmittal of the International Search Report and the Written Opinion of the International Searching Authority, or the Declaration" for International Application No. PCT/US2007/081170; Apr. 10, 2008; pp. 1-14.

United States Patent and Trademark Office; "Office Action Summary" for U.S. Appl. No. 11/674,504; Aug. 5, 2009; pp. 1-19.

United States Patent and Trademark Office; "Office Action Summary" for U.S. Appl. No. 11/674,504; Feb. 8, 2010; pp. 1-17.

Patent Cooperation Treaty; "Notification of Transmittal of the International Search Report and the Written Opinion of the International Searching Authority, or the Declaration" for International Application No. PCT/US2008/068484; Dec. 4, 2008; pp. 1-19.

United States Patent and Trademark Office; "Office Action Summary" for U.S. Appl. No. 11/772,146; Apr. 5, 2010; pp. 1-13.

Carl Eklund et al.; "IEEE Standard 802.16: A Technical Overview of the WirelessMAN (TM) Air Interface for Broadband Wireless Access"; IEEE Communications Magazine; Jun. 2002; pp. 98-107; vol. 40 (No. 6); IEEE Service Center, New York, NY. XP-001123517.

Lior Ophir, Yigal Bitran, and Itay Sherman; "Wi-Fi (IEEE 802.11) and Bluetooth Coexistence: Issues and Solutions"; 15th IEEE International Symposium on Personal, Indoor and Mobile Radio Communications (PIMCR) in Barcelona, Spain; Sep. 5-8, 2004; pp. 847-852 (vol. 2); IEEE, Piscataway, NJ. XP-010753961.

Arto Palin and Mauri Honkanen; "VoIP call over WLAN with Bluetooth headset—multiradio interoperability solutions"; 16th IEEE International Symposium on Personal, Indoor and Mobile Radio Communications (PIMRC) in Berlin, Germany; Sep. 11-14, 2005; pp. 1560-1564; IEEE, Piscataway, NJ. XP-010927402.

Patent Cooperation Treaty, "PCT Search Report and Written Opinion of the International Searching Authority" for International Application No. PCT/US2008/068449, Feb. 9, 2009, 14 pages.

United States Patent and Trademark Office, "Non-Final Rejection" for U.S. Appl. No. 11/772,160, Dec. 29, 2009, 14 pages.

United States Patent and Trademark Office, "Non-Final Rejection" for U.S. Appl. No. 11/772,160, Jun. 28, 2010, 14 pages.

Patent Cooperation Treaty, "PCT Search Report and Written Opinion of the International Searching Authority" for International Application No. PCT/US2008/071657, Nov. 28, 2008, 9 pages.

Hoymann et al., "WiMAX Mobility Support", Proceedings of ITG Conference, Oct. 2006, pp. 85-90.

IEEE, Part 16: Air Interface for Fixed and Mobile Broadband Wireless Access Systems; Amendment 2: Physical and Medium Access Control Layers for Combined Fixed and Mobile Operation in Licensed Bands, and Corrigendum 1 (IEEE Std 802.16e-2005 and IEEE Std 802.16-2004/Corr1-2005), Feb. 28, 2006, see section 6.3. 21, 61 pages.

Zdenek Becvar and Jan Zelenka, "Implementation of Handover Delay Timer into WiMAX", Sixth Conference on Telecommunications, May 2007, pp. 401-404.

United States Patent and Trademark Office, "Notice of Allowance" for U.S. Appl. No. 11/831,170 May 20, 2010, 24 pages.

Patent Cooperation Treaty, "PCT Search Report and Written Opinion of the International Searching Authority" for International Application No. PCT/US2007/081080, Apr. 8, 2008, 16 pages.

IEEE, Standard for Local and Metropolitan Area Networks: Part 16: Air Interface for Fixed and Mobile Broadband Wireless Access Systems (IEEE Std 802.16e-2005), Feb. 28, 2006, pp. 228-231, XP002473897.

United States Patent and Trademark Office, "Non-Final Rejection" for U.S. Appl. No. 11/674,433, Aug. 6, 2009, 21 pages.

United States Patent and Trademark Office, "Final Rejection" for U.S. Appl. No. 11/674,433, Feb. 4, 2010, 19 pages.

IEEE, Part 16: Air Interface for Fixed and Mobile Broadband Wireless Access Systems; Amendment 2: Physical and Medium Access Control Layers for Combined Fixed and Mobile Operation in Licensed Bands, and Corrigendum 1 (IEEE Std 802.16e-2005 and IEEE Std 802.16-2004/Corr1-2005), Feb. 28, 2006, pp. 232-233.

United States Patent and Trademark Office, "Non-Final Office Action Summary", for U.S. Appl. No. 11/772,146, Oct. 19, 2011, 23 pages.

* cited by examiner

METHOD AND APPARATUS FOR COEXISTENCE

FIELD OF THE DISCLOSURE

This disclosure relates generally to coexistence of two different synchronous frame-based wireless communication technologies and more specifically to operation of Bluetooth and Orthogonal Frequency Division Multiple Access (OFDMA) radios on the same device at the same (or nearly the same) frequency band.

BACKGROUND OF THE DISCLOSURE

Coexistence refers to the ability for multiple wireless protocols to operate in or around the same frequency band without significant degradation to either's operation. For example, IEEE 802.16e wireless metropolitan area network communications (sometimes referred to as WiMAX), IEEE 802.11b/g wireless local area network communications (sometimes referred to as WiFi), and IEEE 802.15 wireless personal area network communications (sometimes referred to as Bluetooth) all operate in or around the Industrial, Scientific, and Medical (ISM) band at 2.4-2.5 GHz. Thus, simultaneously using two or more of these technologies in the ISM band (or operating one of these technologies in the ISM band and another near the ISM band), will require coexistence in order to operate effectively.

Within a single mobile station, two or more radio transceivers operating in or around the same band may cause internal interference. Transmitting using one technology at a frequency band while receiving using the other technology at the same or similar frequency band will lead to adjacent channel interference and receiver de-sense. Because IEEE 802.11b/g framing is asynchronous Ethernet-based and Bluetooth Synchronous Connection Oriented (SCO) framing for voice communication is synchronous, it is possible for the mobile station to delay IEEE 802.11b/g transmissions to a point in time when the mobile station's Bluetooth receiver is not active and thus reduce internal interference. However, because IEEE 802.16e uses synchronous framing and Bluetooth SCO links also use synchronous framing, there is little flexibility to delay one technology's transmission relative to the other technology's reception. When an IEEE 802.16e radio is transmitting simultaneously with a Bluetooth radio receiving, and vice versa, packet losses can be as high as 25% on the downlink (from a base station, or access point, to the mobile station) and 38% on the uplink (from the mobile station to the base station or access point).

Further complicating matters, it is desirable to spread energy on the ISM band "randomly" so it will look more like white noise. The practical effect of this desire is that synchronization of the IEEE 802.16e and Bluetooth radio clocks within a single mobile station is not preferred. Additionally, Bluetooth communications on the unlicensed 2.4-2.5 GHz ISM band should not consistently degrade IEEE 802.16e communications on the licensed Multichannel Multipoint Distribution Service (MMDS) and Instructional Television Fixed Service (IFTS) bands at 2.5-2.7 GHz in the United States or IEEE 802.16e communications in the 2.3 GHz band in Canada, South Korea, and United States.

Thus, there is an opportunity to develop methods and apparatus for Bluetooth SCO-link coexistence with OFDMA synchronous framing communications that will reduce the risk of internal interference without synchronizing the clocks of those two radios within the same mobile station. The various aspects, features and advantages of the disclosure will become more fully apparent to those having ordinary skill in the art upon careful consideration of the following Drawings and accompanying Detailed Description.

DETAILED DESCRIPTION

A method for coexistence of an orthogonal frequency division multiple access (OFDMA) receiver with a synchronous frame-based transmitter takes an estimated media access protocol (MAP') signal indicating when a MAP message is expected to be received by the OFDMA receiver and sends the MAP' signal to the synchronous frame-based transmitter to shut down the synchronous frame-based transmitter when a MAP message is expected to be received. If a MAP' signal is not directly available from the OFDMA receiver, a frequency, phase, and duration of a future MAP symbol (in the MAP' signal) can be determined from an OFDMA receiver-enable (RXE) signal by using techniques such as microcontroller unit interrupt measurements, Fast Fourier Transform, cross-correlation, and/or symbol timing recovery such as delay-locked loop.

One type of OFDMA system is a WiMAX system in accordance with IEEE 802.16e. Because a single frame size is commonly used today for WiMAX systems (and one MAP message is contained at the beginning of each WiMAX frame), the frequency of the MAP' signal could alternately be predetermined. Additionally, estimates of future MAP symbol duration could be predetermined based on the type of OFMDA link (e.g., video, voice, data) and/or historical MAP symbol duration information.

A co-existence predictor that could be used to implement the above method has an observer unit for determining historical MAP symbol frequency, duration, and phase from an RXE signal provided by the OFDMA receiver, an estimator unit for predicting future MAP symbols, and a decision logic unit for producing a shut down signal to the synchronous frame-based transmitter when future MAP symbols are expected.

By using the MAP' signal to control shut down of the synchronous frame-based transmitter, the synchronous frame-based transmitter will not cause internal interference with the OFDMA receiver during expected receipt of MAP messages. Reliable receipt of MAP messages allows the OFDMA receiver to maintain synchronization with an external OFDMA transmitter. The decision logic unit may also choose to shut down the synchronous frame-based transmitter depending on the relative priorities of frames being transmitted by the synchronous frame-based transmitter and downlink data expected to be received by the OFDMA receiver.

As mentioned previously, WiMAX is an OFDMA communication technology, and Bluetooth SCO is a synchronous frame-based communication technology. The co-existence predictor and its method supports WiMAX and Bluetooth coexistence by reducing the risk that internal interference will cause the loss of a MAP message. This solution also provides a balance between successful receipt of important WiMAX packets and successful transmission of Bluetooth packets.

Figure 1:
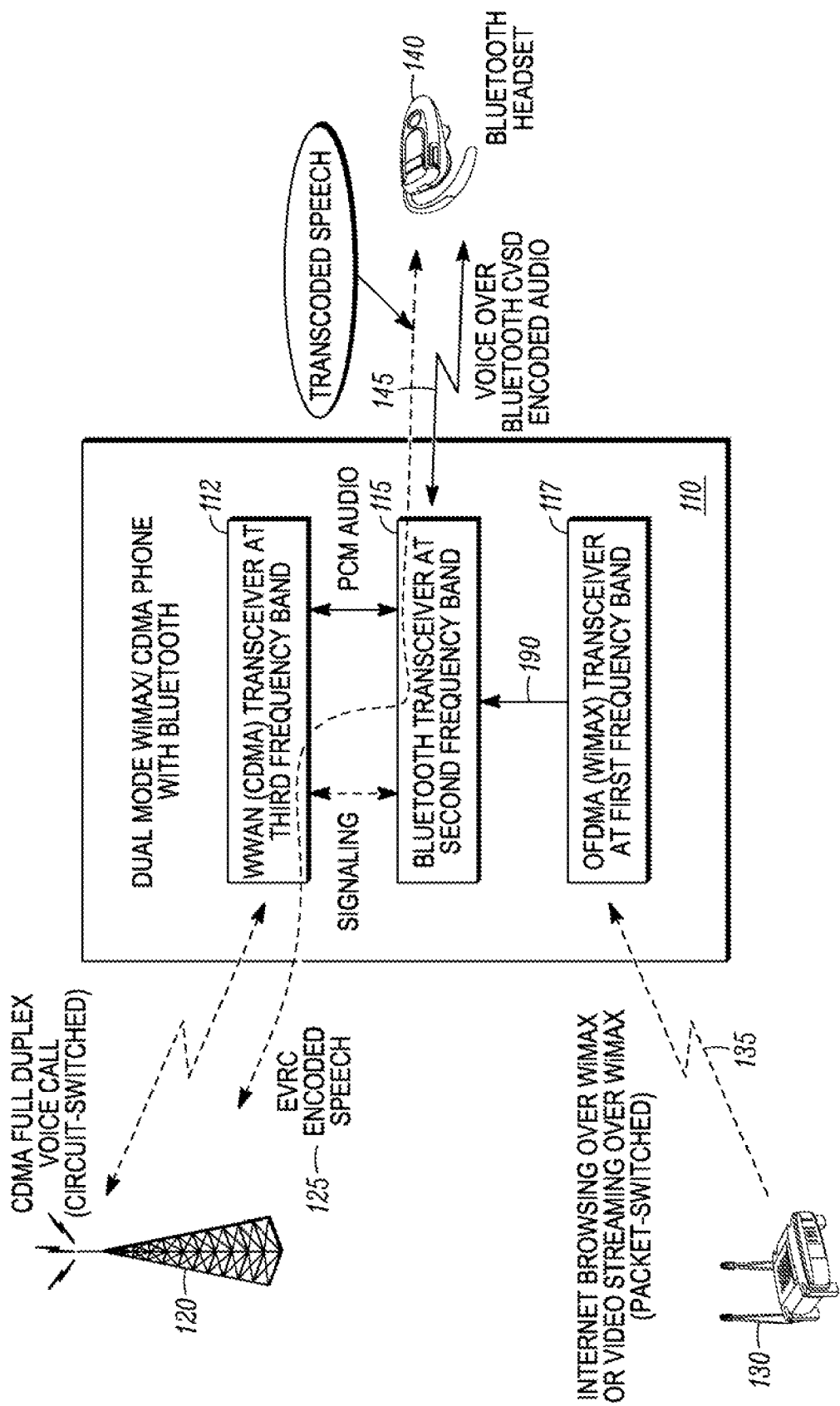
FIG. 1 shows an example of a system diagram having a dual mode WiMAX/CDMA phone with Bluetooth.

FIG. 1 shows an example of a system diagram 100 including a mobile station 110 having OFDMA radio transceiver 117 operating at a first frequency band, a Bluetooth Wireless Personal Area Network (WPAN) radio transceiver 115 operating at a second frequency band near the first frequency band, and a Wireless Wide Area Network (WWAN) radio transceiver 112 operating at a third frequency band far from the first frequency band. In this example, the WWAN radio transceiver 112 is implemented as a Code Division Multiple Access (CDMA) user equipment transceiver operating at 1900 MHz; although the WWAN radio could alternately be Wideband-CDMA (W-CDMA), CDMA2000, Global System for Mobile Communications (GSM), Time Division Multiple Access (TDMA), or other protocols operating at other frequency bands. The CDMA radio transceiver 112 of the mobile station 110 uses a first wireless communication link 125 at 1900 MHz to communicate with a CDMA base station 120. This example presumes that the first communication link 125 handles a full-duplex voice call (circuit-switched connection) including speech encoded with Enhanced Variable Rate Codec (EVRC) technology. The speech is transcoded with Continuous Variable Slope Delta (CVSD) modulation to be sent using the Bluetooth transceiver 115 over a second wireless communication link 145 at 2.4 GHz to the Bluetooth headset 140. Bluetooth uses Synchronous Connection Oriented (SCO) links for voice where timeslots are fixed and packets are not re-transmitted.

In this example, the OFDMA transceiver 117 is an IEEE 802.16e transceiver operating at 2.5 GHz, which will require coexistence with the Bluetooth transceiver operating at 2.4 GHz. Note that the OFDMA transceiver 117 could alternately be implemented as a UTRA-UTRAN Longer Term Evolution (LTE) transceiver, a Multiband OFDM Alliance (MBOA) ultra-wide band (UWB) transceiver, or any other OFDMA synchronous framing system operating in the same or adjacent band as the Bluetooth transceiver. If a user of the mobile station 110 is Internet browsing or video streaming using the OFDMA transceiver 117 over a third wireless communication link 135 at 2.5 GHz to an access point 130 (sometimes referred to as a base station), the Bluetooth transceiver 115 will be controlled through a Bluetooth shutdown signal 190 to reduce internal interference, receiver de-sense, and packet collisions.

Variations of this system diagram 100 may exclude the WWAN first communication link 125 at 1900 MHz, because it is not a cause of interference at the first and second frequency bands (2.4-2.5 GHz). For example, if a user had a video streaming third wireless communication link 135 at 2.5 GHz and was listening to the stereo audio portion retransmitted over the Bluetooth second wireless communication link 145 at 2.4 GHz, this would require coexistence. Also, if a user had a Voice over Internet Protocol (VoIP) third wireless communication link 135 at 2.5 GHz and was listening to the voice using the Bluetooth headset, this too would also require coexistence.

By using a Bluetooth shutdown signal 190, the mobile station 110 can protect the OFDMA receiver 117 from internal interference when an important OFDMA message is expected to be received. When no important OFDMA message is expected to be received, the Bluetooth transmitter can be controlled depending on the relative importance of any Bluetooth message to be transmitted and any OFDMA data to be received. Before explaining the Bluetooth shutdown signal 190 in detail, the format of OFDMA frames will be described.

Figure 2:
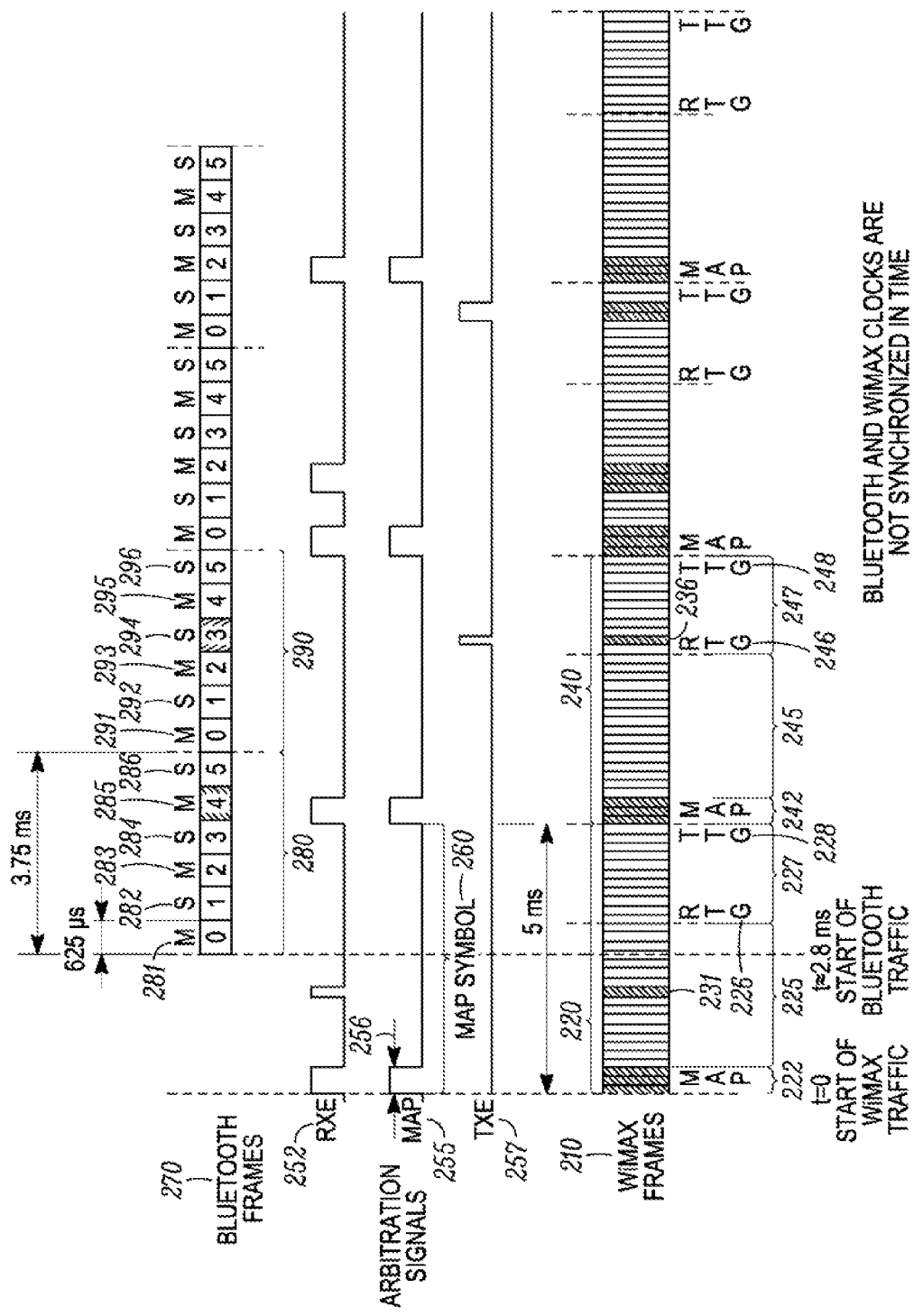
FIG. 2 shows a diagram of IEEE 802.16e (WiMAX) downlink frames, IEEE 802.16 (Bluetooth) frames, and associated signals.

FIG. 2 shows a diagram of IEEE 802.16e frames 210 (which will also be called WiMAX frames for ease of reference), IEEE 802.15 frames 270 (which will be also called Bluetooth frames), and associated signals. WiMAX is an example of an OFDMA system. Other OFDMA systems include UTRAN-LTE and MBOA-UWB. A single WiMAX frame 220, 240 has three major components: a Media Access Protocol (MAP) message 222, 242 at the beginning, followed first by a downlink sub-frame 225, 245 and then an uplink sub-frame 227, 247. The MAP message 222, 242 is variable in duration and changes as the number of scheduled users changes. Thus, the size of the MAP message 222, 242 may change slightly from one WiMAX frame to the next. Although, conventionally, the overall duration of a single WiMAX frame 220, 240 is 5 milliseconds, Section 11.18.1 and Table 384a of IEEE Standard 802.16e specify eight possible WiMAX frame durations ranging from 2 milliseconds to 20 milliseconds.

The reception of MAP messages 222, 242 is important to IEEE 802.16e (and other types of OFDMA) system performance because a MAP message 222, 242 is used to allocate active downlink OFDMA symbols 231 on the current WiMAX frame 220 and active uplink OFDMA symbols 236 on the next WiMAX frame 240. The end of a downlink sub-frame and the beginning of an uplink sub-frame can vary from one WiMAX frame to the next, and MAP messages are important for maintaining synchronization between a mobile station and an access point (sometimes referred to as a base station). If a MAP message is lost, then a mobile station will not know when to listen for downlink data and when to transmit uplink data on the next WiMAX frame. Thus, a MAP indicator signal 255 indicates when a MAP message 222, 242 is expected to be received. The MAP indicator signal 255 includes a sequence of MAP symbols 260, which have a periodicity (frequency and phase) and slowly-varying duration 256. Thus, a MAP symbol has an active pulse of a MAP duration 256 and a non-active "tail" to complete the MAP symbol. The MAP symbol indicates when a MAP message is being received (i.e., during the active pulse of the MAP symbol) and when no MAP message is being received (i.e., during the inactive "tail" of the MAP symbol).

Signal 255 can be used directly as the Bluetooth shutdown signal 190 (FIG. 1) and control the Bluetooth radio transmitter. Thus, when signal 255 is active, the Bluetooth radio transmitter is off. This prevents the Bluetooth transmitter from creating internal interference while the OFDMA receiver will be receiving a MAP message. Allowing the Bluetooth receiver to remain functional lets the Adaptive Frequency Hopping (AFH) algorithm contained in the Bluetooth device to continue its channel interference analysis. Optionally, on some designs, it may be advantageous to simply disable the entire Bluetooth transceiver while receiving the MAP message.

If a MAP indicator signal 255 is not available, several methods can be used to construct a MAP' signal from a WiMAX receiver-enable (RXE) signal 252 to create a Bluetooth shutdown signal 190 for the Bluetooth radio transceiver that reduces interference and yet allows for reliable reception of MAP messages without totally undermining Bluetooth communications. The RXE signal 252 is high whenever the OFDMA receiver is active. Thus, the RXE signal 252 is high during the MAP message of every WiMAX frame and also during active downlink sub-frames such as downlink sub-frame 231. Currently, there is no way to distinguish one RXE signal pulse from another. In other words, both a MAP message and downlink data will both cause a pulse of unit amplitude on the RXE signal.

As can be seen from the RXE signal 252 shown in FIG. 2, the RXE signal goes high during every MAP message, which occurs in this example every 5 milliseconds for about 504 microseconds. The RXE signal 252 also goes high during downlink data reception, which is not as consistent in frequency or duration as the MAP messages. By analyzing the pattern of pulses within an RXE signal 252, embedded MAP symbols can be hypothesized and verified.

Similarly, the transmitter-enable (TXE) signal 257 is activated during a transmission portion of the uplink sub-frame, corresponding to active uplink OFDMA symbols 236 in this example. TXE signal 257 activation does not occur as often as the MAP portion of the RXE signal 252 because MAP messages are monitored even in sleep mode when there is no uplink data to transmit. Because a WiMAX frame 240 has a MAP message 242 followed by a downlink sub-frame 245 and then an uplink sub-frame 247, a pulse in the TXE signal 257 (corresponding to uplink symbol 236 in this example) will be followed-in-time by a pulse on the RXE signal 252 which indicates a MAP message. There are also fixed time periods between the time an OFDMA transceiver receives and transmits called the Transmit Transition Gap (TTG) 228, 248 and vice versa with a Receive Transition Gap (RTG) 226, 246 to prepare the device for switching between receive and transmit mode. Knowing the TTG can be useful when using the TXE signal to find a MAP symbol within the RXE signal 252, because reception and a MAP message will occur after a transmit interval, TTG.

FIG. 2 also shows a diagram of Bluetooth frames 270 aligned arbitrarily in time with WiMAX frames 210. Each Bluetooth frame 280, 290 lasts 3.75 milliseconds and has a maximum of six timeslots 281, 282, 283, 284, 285, 286, 291, 292, 293, 294, 295, 296 that alternate between the master and slave every 625 microseconds. In this illustration, the Bluetooth timeslots 281, 283, 285, 291, 293, 295 labeled with an 'M' are the possible transmissions of the Bluetooth transceiver 115 (FIG. 1) and the timeslots 282, 284, 286, 292, 294, 296 labeled with an 'S' are the possible receptions of the Bluetooth transceiver 115. When a Bluetooth master timeslot 285 aligns with an active portion of the RXE signal 252, the Bluetooth transceiver 115 will cause interference with the WiMAX transceiver's 117 receptions. Conversely, when a Bluetooth slave timeslot 294 aligns with an active portion of the TXE signal 257, the WiMAX transceiver 117 will interfere with the Bluetooth transceiver's 115 receptions.

In order to minimize interference between Bluetooth transmissions and WiMAX receptions (and vice versa) as shown at Bluetooth timeslots 285, 294, the Bluetooth transceiver 115 (FIG. 1) will be shut down using a Bluetooth shutdown signal 190 when WiMAX MAP messages are expected and possibly also at times when WiMAX downlink data is expected.

Figure 3:
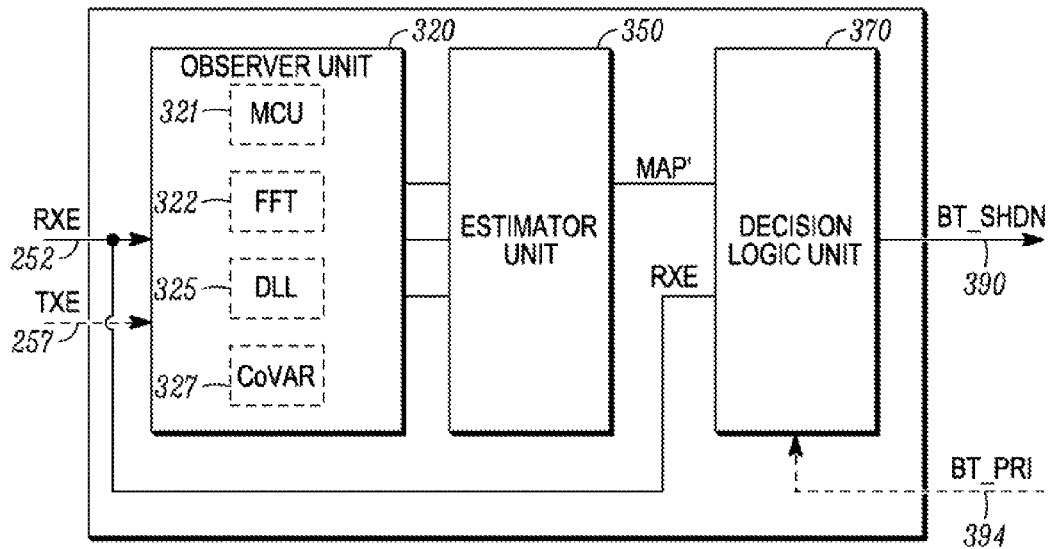
FIG. 3 shows a co-existence predictor that can be used to determine when to shut down a Bluetooth transmitter.

FIG. 3 shows a co-existence predictor 300 that can be used to determine when to shut down a Bluetooth transceiver 115 (FIG. 1) in the absence of a MAP indicator signal 255 (FIG. 2). The co-existence predictor 300 uses the RXE signal 252 (FIG. 2) of the OFDMA transceiver 117 (FIG. 1) to produce a BT_SHDN signal 390 that can be used as the Bluetooth shutdown signal 190 (FIG. 1). The predictor can optionally use the TXE signal 257 in conjunction with the RXE signal 252 to produce a BT_SHDN signal 390.

The co-existence predictor 300 includes an observer unit 320, an estimator unit 350, and a decision logic unit (DLU) 370. The observer unit 320 monitors the RXE signal 252 from a coexistent OFDMA transceiver 117 and analyzes its periodicity (frequency and phase) and pulse duration looking for embedded MAP symbols representing receipt of MAP messages. Because MAP messages are periodic and do not vary quickly in duration, the estimator unit 350 can take the historical MAP symbol information from the observer unit 320 and generate a MAP' signal representing the expected location-in-time of future MAP symbols. The decision logic unit 370 generates the BT_SHDN signal 390 based on the MAP' signal and an optional BT_PRI signal 394 that indicates when a priority Bluetooth packet will be transmitted.

The observer unit 320 can include one or more components used to extract MAP symbols from an RXE signal 252. A microcontroller unit 321, a Fast Fourier Transform block 322, a delay-locked loop 325, and/or a covariance block 327 can be used to find the frequency, phase, and duration of a MAP symbol.

Figure 4:
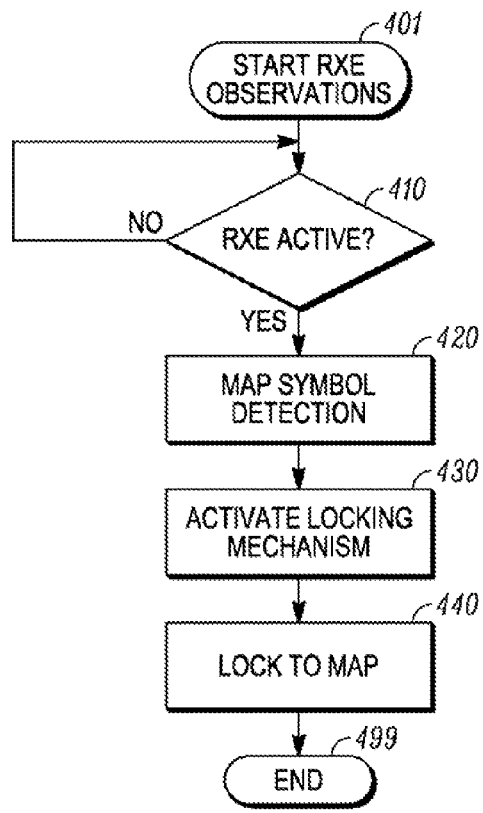
FIG. 4 shows a flow chart for operation of an observer unit of the co-existence predictor shown in FIG. 3.

FIG. 4 shows a flow chart 400 for operation of the observer unit 320 of the co-existence predictor 300 shown in FIG. 3. In step 401, the observer unit 320 starts observing the RXE signal 252 (shown in FIG. 2 and FIG. 3). When step 410 determines that the RXE signal 252 is active, step 420 performs MAP symbol detection. Although a high RXE signal for a MAP message is indistinguishable from a high RXE signal for downlink data receipt, over time the observer unit 320 can detect a periodic high RXE signal of fairly consistent duration and hypothesize a MAP symbol. Even when there are one or more sleep frames, characterized by an absence of any transmission or reception activity for a predetermined number of OFDMA frames, various techniques can be used to detect a MAP symbol within an RXE signal.

After one or more possible MAP symbols are detected in step 420, step 430 activates a locking mechanism to verify whether the next expected MAP symbol (based on the previous possible MAP symbols) has arrived on the RXE signal as expected. If the RXE signal is active at the time(s) predicted by the locking mechanism, step 440 locks to the MAP symbols on the RXE signal. The flow chart ends with step 499.

MAP symbol detection step 420 can be implemented in an observer unit 320 in a number of ways. One simple but processor-intensive method takes samples of the RXE signal 252 for a predetermined period of time, notes transitions from low-to-high and high-to-low, and looks for a common pattern in the transitions to hypothesize as MAP symbols. Another method uses a Fast Fourier Transform to find the most-common periodic symbol to hypothesize as a MAP symbol. A third method uses a delay-locked loop to find a common symbol's frequency and phase, which is then hypothesized as the MAP symbol. And a fourth method uses covariance analysis to match an expected MAP symbol pattern with the RXE signal.

Figure 5:
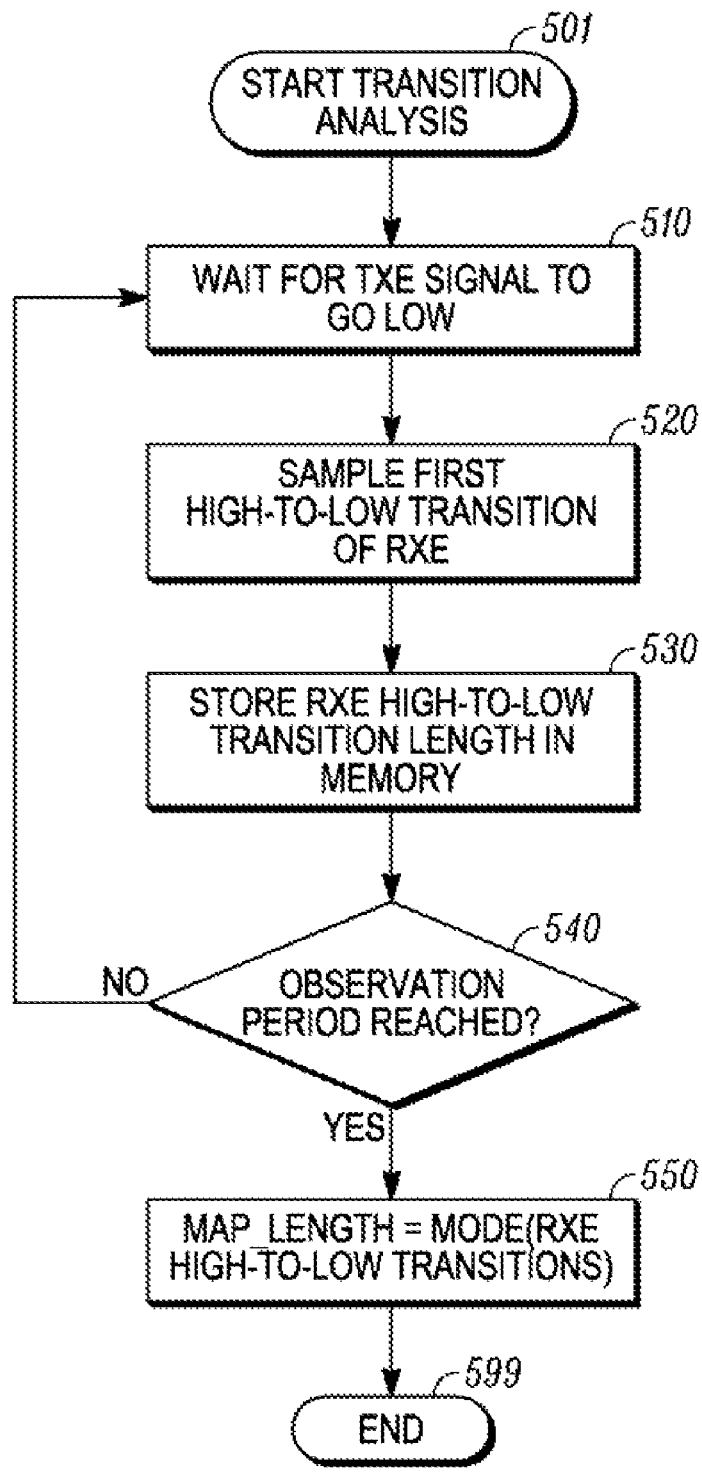
FIG. 5 shows a flow diagram for detecting MAP symbols using transition analysis of a receiver-enable (RXE) signal.

FIG. 5 shows a flow diagram 500 for detecting MAP symbols using transition analysis of an RXE signal 252 (FIG. 2). The flow diagram 500 can be implemented as part of MAP symbol detection step 420 (FIG. 4) by a microcontroller unit (MCU) 321 (FIG. 3) with interrupt-driven methods and programmable timers. After start step 501, step 510 waits for the TXE signal to be low. After the TXE is low, the first transition of the RXE signal from high-to-low is sampled in step 520. Step 530 stores the time of the high-to-low transition in memory. Until the observation period is reached as determined by step 540, the memory continues to accumulate times when the RXE signal transitions from high-to-low. At the conclusion of the observation period, step 550 determines the frequency and phase of the MAP symbols from the statistical mode of the time period between high-to-low transitions of the RXE signal stored in memory. The method ends at step 599.

Because MAP messages are expected to produce the most periodic pulse within an RXE signal (even when there are one or more sleep frames within the observation period), finding the most common high-to-low transition period should produce the hypothetical MAP symbol and not select the less-periodic active downlink symbols. Additionally, by modifying the flow diagram to note both low-to-high transitions as well as high-to-low transitions, the MAP symbol duration can be found by measuring the length of time the hypothetical MAP pulse is high before the high-to-low transitions hypothesized to be part of MAP symbols.

Figure 6:
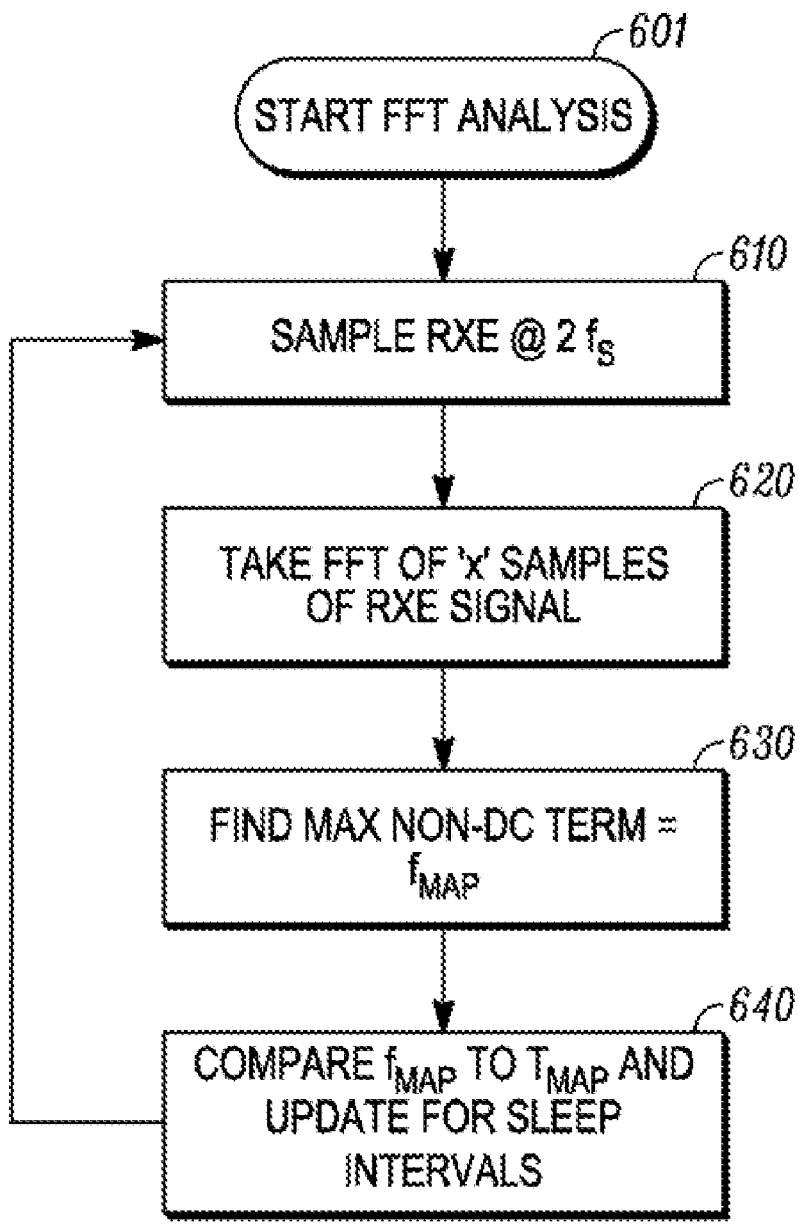
FIG. 6 shows a flow diagram for finding MAP symbols within an RXE signal that uses Fast Fourier Transform (FFT) techniques.

FIG. 6 shows a flow diagram 600 of another method for finding a MAP symbol within an RXE signal 252 (shown in FIG. 2 and FIG. 3) that uses Fast Fourier Transform (FFT) techniques. The flow diagram 600 can be implemented as part of MAP symbol detection step 420 (FIG. 4). An observer unit 320 (FIG. 3) can use an FFT block 322 to find MAP symbol frequency and phase and also detect sleep intervals.

After start step 601, step 610 samples an RXE signal 252. In this embodiment, the RXE signal 252 is sampled at twice the Nyquist frequency $f_S$, which is the inverse of half the shortest OFDMA symbol duration. Step 620 takes the Fast Fourier Transform of a predetermined number 'x' of samples of the RXE signal. Step 630 estimates that the highest-amplitude non-DC term of the FFT indicates the MAP symbol frequency and phase. Given that a 5 millisecond WiMAX frame is ubiquitous currently, a MAP symbol should usually occur every 5 milliseconds.

During a sleep frame, no MAP, downlink (DL), or uplink (UL) messages are transmitted. Thus, sleep frames can alter the FFT block 322 output compared to the theoretical output in the absence of sleep frames. To compensate for the possible existence of sleep frames within the sampled RXE signal, step 640 compares the $f_{MAP}$ returned from the FFT block 322 with known frame and sleep durations and tests across a subset of MAP periods, $T_{MAP}$, to enhance the periodic analysis performed by the FFT block 322. The steps in the flow diagram 600 can be repeated as necessary to confirm the hypothetical MAP symbol frequency and phase within an RXE signal.

Figure 7:
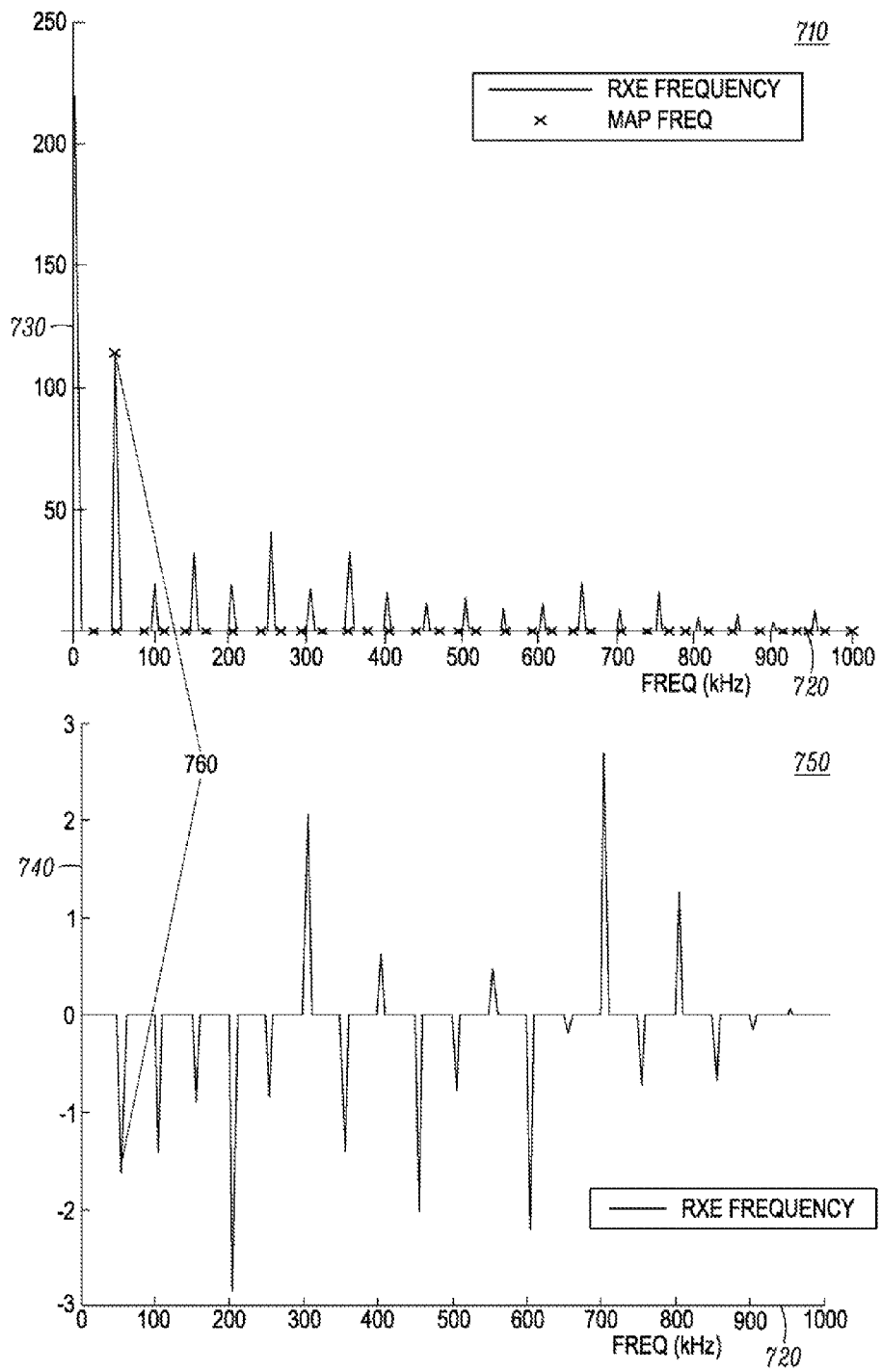
FIG. 7 shows a sample diagram of analysis performed by the FFT block shown in FIG. 3 operating in accordance with the flow diagram shown in FIG. 6.

FIG. 7 shows a sample frequency and phase diagrams 710, 750 of analysis performed by the FFT block 322 shown in FIG. 3 operating in accordance with the flow diagram 600 shown in FIG. 6. The x-axis 720 displays frequency and the y-axes 730, 740 display amplitude and phase (respectively) of a frequency analysis of an RXE signal 252. As shown, the frequency and phase of the hypothetical MAP symbol is determined by selecting the most frequent periodic symbol 760. The FFT block 322 finds the MAP symbol frequency and the FFT block 322 can be used to distinguish between different WiMAX frame durations and sleep intervals.

As an alternate or an addition to the FFT block 322 of FIG. 3 (or the MCU 321), a covariance (CoVAR) block 327 can discern the presence of a hypothetical MAP symbol within an RXE signal 252. The CoVAR block 327 works by observing an incoming RXE signal for a period of time and calculating a correlation between the incoming RXE signal and a predetermined signal chosen to best represent an expected MAP signal. Processing by the CoVAR block 327 can be conducted on a group of RXE signal samples. The correlation between the RXE signal 252 and a shifting expected MAP pattern P can be computed for every shift k according to the following formula.

$$\rho_k = \frac{\sum_{i=1}^{N} RXE_i P_{ki} - (1/N)\left(\sum_{i=1}^{N} RXE_i \sum_{i=1}^{N} P_{ki}\right)}{\sqrt{\sum_{i=1}^{N} RXE_i^2 - (1/N)\left(\sum_{i=1}^{N} RXE_i\right)^2} \sqrt{\sum_{i=1}^{N} P_{ki}^2 - (1/N)\left(\sum_{i=1}^{N} P_{ki}\right)^2}} \quad (1)$$

where k changes from 1 to a predetermined maximum number of shifts. For the examples to be shown, the predetermined maximum number of shifts is selected to be 120. Thus, the cross-correlation between RXE and P is calculated for every shift of the expected MAP pattern P.

Alternatively, a recursive (real-time) method can be used to calculate $\rho_k$ based on a previously calculated value of $\rho_{k-1}$. The output of the CoVAR block 327 can be used to determine periodicity, indicating the frequency and phase of a MAP symbol in the observed RXE signal. The derivative, or slope, of the correlation function can be used to initiate locking onto a MAP signal when the sign of the derivative changes. The calculated correlation coefficients with a global extremum can also be used in conjunction with a delayed-lock loop (DLL) to lock onto the maximum correlation.

Figure 8:
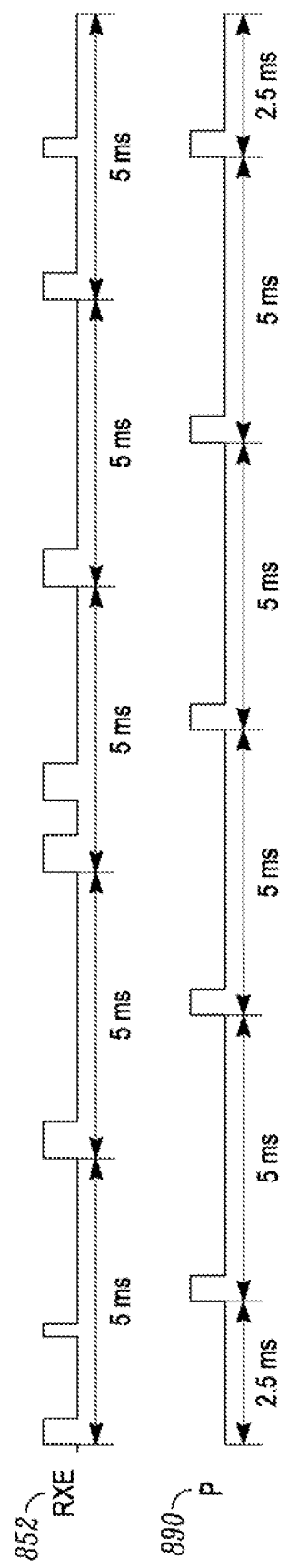
FIG. 8 shows a simple graphical example of an observed RXE signal and an expected MAP pattern P.

FIG. 8 shows a simple graphical example 800 of an observed RXE signal 852 and an expected MAP pattern P 890. In this example, the RXE signal 852 is 25 milliseconds long and contains a MAP symbol of 504 microseconds duration at the beginning of each 5 millisecond frame plus active downlink pulses at various other times. The given MAP symbol pattern P 890 is a 25 millisecond sequence of MAP symbols having a duration of 504 microseconds and repeating every 5 milliseconds. Using equation (1) produces a cross-correlation graph similar to the one shown in FIG. 9.

Figure 9:
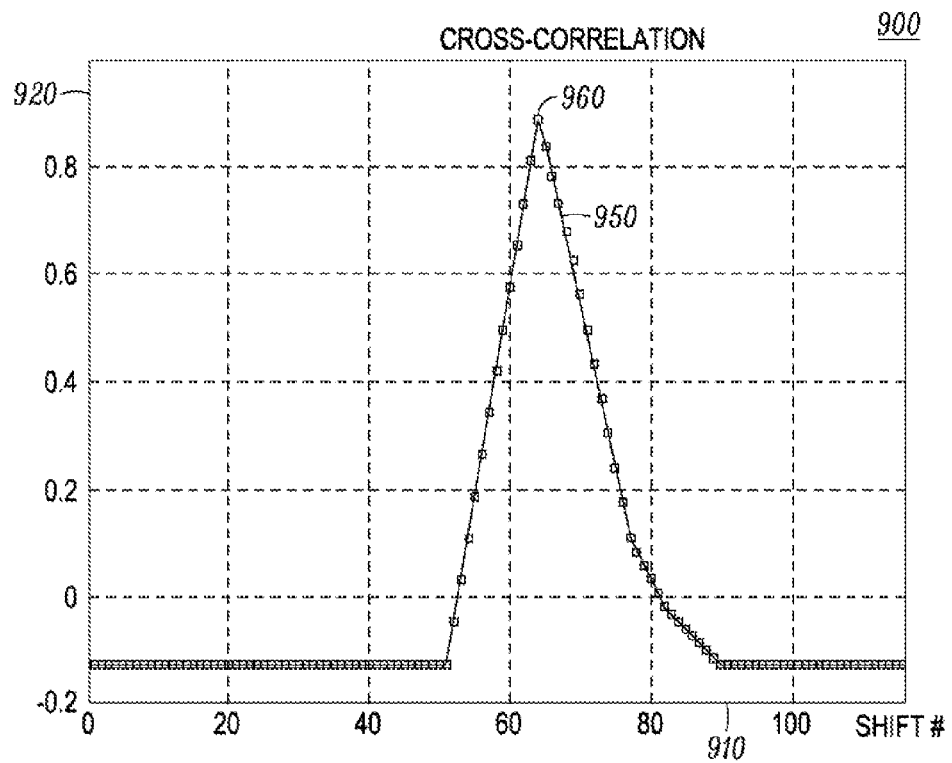
FIG. 9 shows a graph of cross-correlation between the observed RXE signal and the expected MAP pattern P of FIG. 8.

FIG. 9 shows a cross-correlation graph 900 where the x-axis 910 represents the number of shifts from 0 to a predetermined maximum of 120 (taking 120 as an example) and where the y-axis 920 represents the magnitude of the cross-correlation. The results 950 of the cross-correlation of the observed 25 milliseconds of the incoming RXE signal 852 with the expected MAP symbol pattern P 890 peaks at point 960, which is at shift 64, and indicates that the MAP symbols indicated in the RXE signal 852 lag behind the timing of the expected MAP symbol pattern P by 64 shifts (or leads the expected MAP pattern P by 56 shifts). Even if there had been sleep frames within the observed RXE signal, there would still be a peak where the cross-correlation of the expected MAP symbol pattern P best matches the observed RXE signal.

Figure 10:
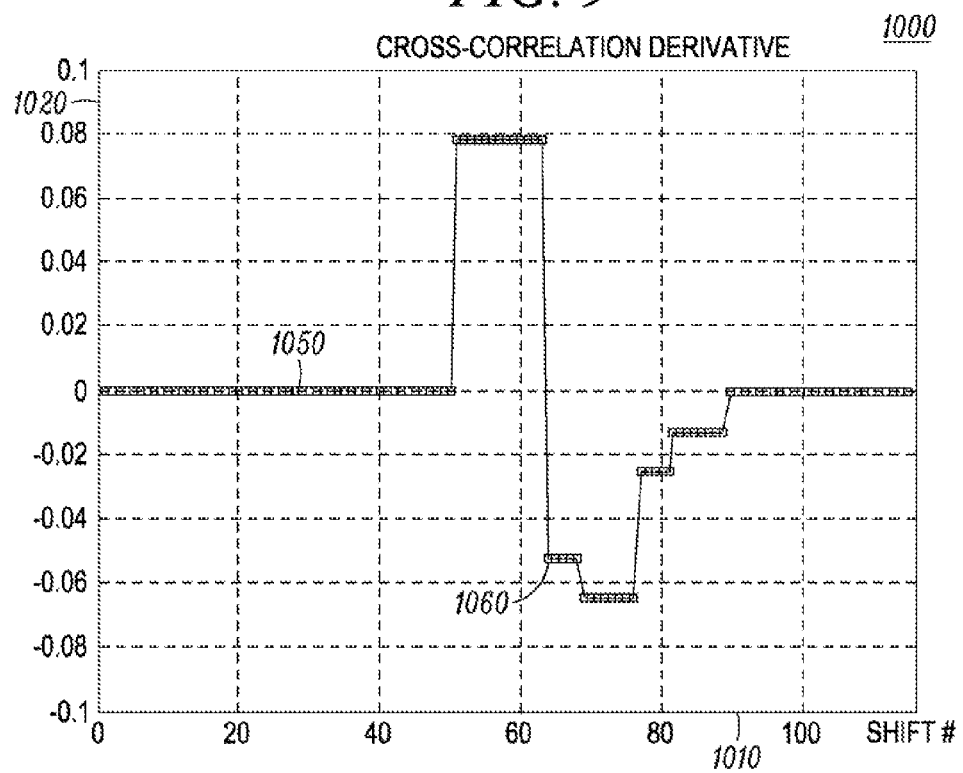
FIG. 10 shows a derivative graph of the cross-correlation shown in FIG. 9.

FIG. 10 shows a cross-correlation derivative graph 1000 where the x-axis 1010 represents the number of shifts from 0 to a predetermined maximum of 120 (taking 120 as an example) and the y-axis 1020 represents the magnitude of the derivative of the cross-correlation results shown in FIG. 9. As shown, the sign S of the derivative results 1050 changes to negative at point 1060, which happens to be at 64 shifts. Depending on the frequency and duration of sleep frames, the sign S of the derivative may change at a point that is different from (or the same as) the peak in the cross-correlation graph 900.

The duration of a MAP symbol within the RXE signal is not necessarily constant although current implementations generally result in MAP symbol durations of about 504 microseconds and sometimes tens of microseconds more. Duration, also, can be estimated for an observed RXE signal using covariance analysis. The value at the peak 960 (FIG. 9) of the cross-correlation results 950 can be used to estimate the duration of the hypothetical MAP symbols as a percentage of the duration of the high pulses in the expected MAP pattern P 890 (FIG. 8).

Figure 11:
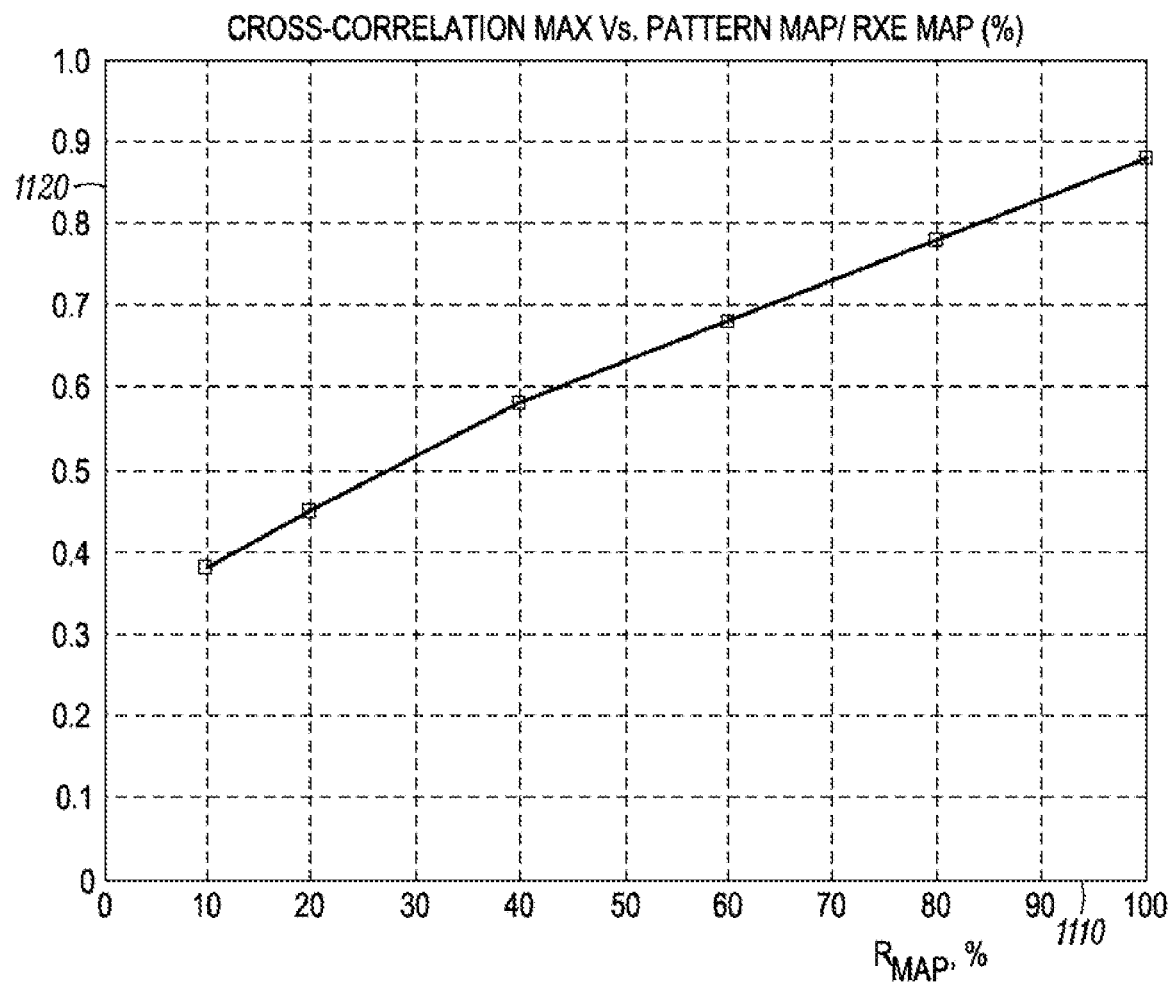
FIG. 11 shows a graph of cross-correlation maximum versus the expected MAP pattern P as a percentage.

FIG. 11 shows a graph 1100 of cross-correlation maximum versus the expected MAP pattern P as a percentage of the downlink sub-frame. X-axis 1110 represents the percentage of a downlink sub-frame while y-axis 1120 shows the peak values of the cross-correlation graph. Taking the example given throughout FIGS. 8-10 where MAP symbols occur at 5 millisecond intervals in both the RXE signal and the expected MAP pattern P, the peak value at point 960 (FIG. 9) is approximately 0.9. This indicates a very high peak cross-correlation value and thus the duration of a MAP symbol in the RXE signal can be estimated to be 100% of the duration of a MAP symbol within the expected MAP pattern P. If, for example, the peak value of a cross-correlation graph was 0.63, then the duration of a MAP symbol in the RXE signal is estimated to be only 50% of the duration of a MAP symbol within the expected MAP pattern P. Although this graph 1100 presumes no sleep intervals within the observed RXE signal or the expected MAP pattern P, different covariance graphs can be constructed for different patterns of sleep intervals by selecting expected MAP patterns incorporating various sleep intervals. The covariance graph with a highest peak cross-correlation value will indicate the closest expected MAP pattern.

Figure 12:
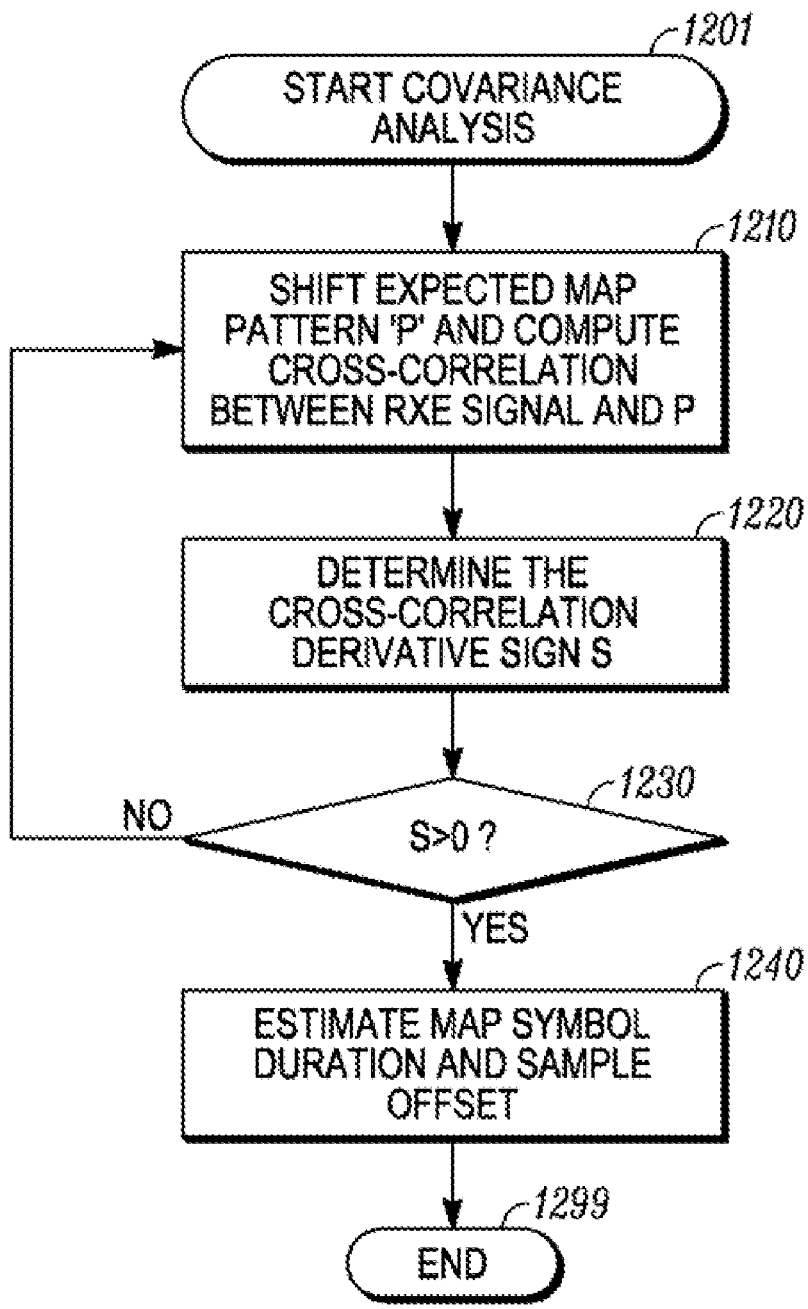
FIG. 12 shows a flow diagram of a covariance method for finding MAP symbols within an RXE signal.

FIG. 12 shows a flow diagram 1200 of this covariance method for finding a MAP symbol within an RXE signal 252 (shown in FIG. 2 and FIG. 3). The flow diagram 1200 can be implemented as part of MAP symbol detection step 420 (FIG. 4). An observer unit 320 (FIG. 3) can use a CoVAR block 327 to find MAP symbol frequency, phase, and/or duration.

The method starts when start step 1201 selects an expected MAP pattern P. This expected MAP pattern P can be selected from one or more expected MAP patterns stored within the mobile station 110 (FIG. 1) based on one or more factors such as: historical frequency of success by the mobile station 110 in detecting MAP symbols using a particular expected MAP pattern, a preset order for using expected MAP patterns, knowledge of the type of OFDMA link currently active (e.g., VoIP, internet, etc.), and/or any known connection setup or sleep interval information. Step 1210 shifts the given MAP pattern P a preset number of times (e.g., 120 times) and computes a cross-correlation between a given portion of the RXE signal and P. Step 1220 determines the derivative sign S of the cross-correlation. When the derivative sign S changes from a positive value to a negative value (or zero) as determined by step 1230, the peak value of the cross-correlation function can be used to estimate the hypothetical MAP symbol duration and sample offset in step 1240. Then the flow diagram 1200 ends in step 1299. If periodicity cannot be detected after a predefined number of expected MAP pattern P shifts, the algorithm exits abnormally and may restart at step 1201 and select another expected MAP pattern P.

Thus, a covariance technique provides yet another alternate method for observing a MAP symbol in an RXE signal. Once the periodic MAP symbol is located in time, the locking mechanism can be activated in step 430. Of course, if sleep frames are included in the observed RXE signal 852 (FIG. 8) such that no MAP message is included in a sleep frame, then the peak magnitude of the cross-correlation results will not be as high—unless an expected MAP pattern has the same sleep pattern. Even without a perfect expected MAP pattern match, the general results will still occur, and the shift number where the cross-correlation derivative goes negative in amplitude will indicate when the locking mechanism should be activated.

Yet another method of observing a MAP symbol within an RXE signal uses a delayed-lock loop (DLL) 325 (FIG. 3). A DLL will lock to MAP message timing, even when observations do not begin with a MAP message on the RXE signal.

Figure 13:
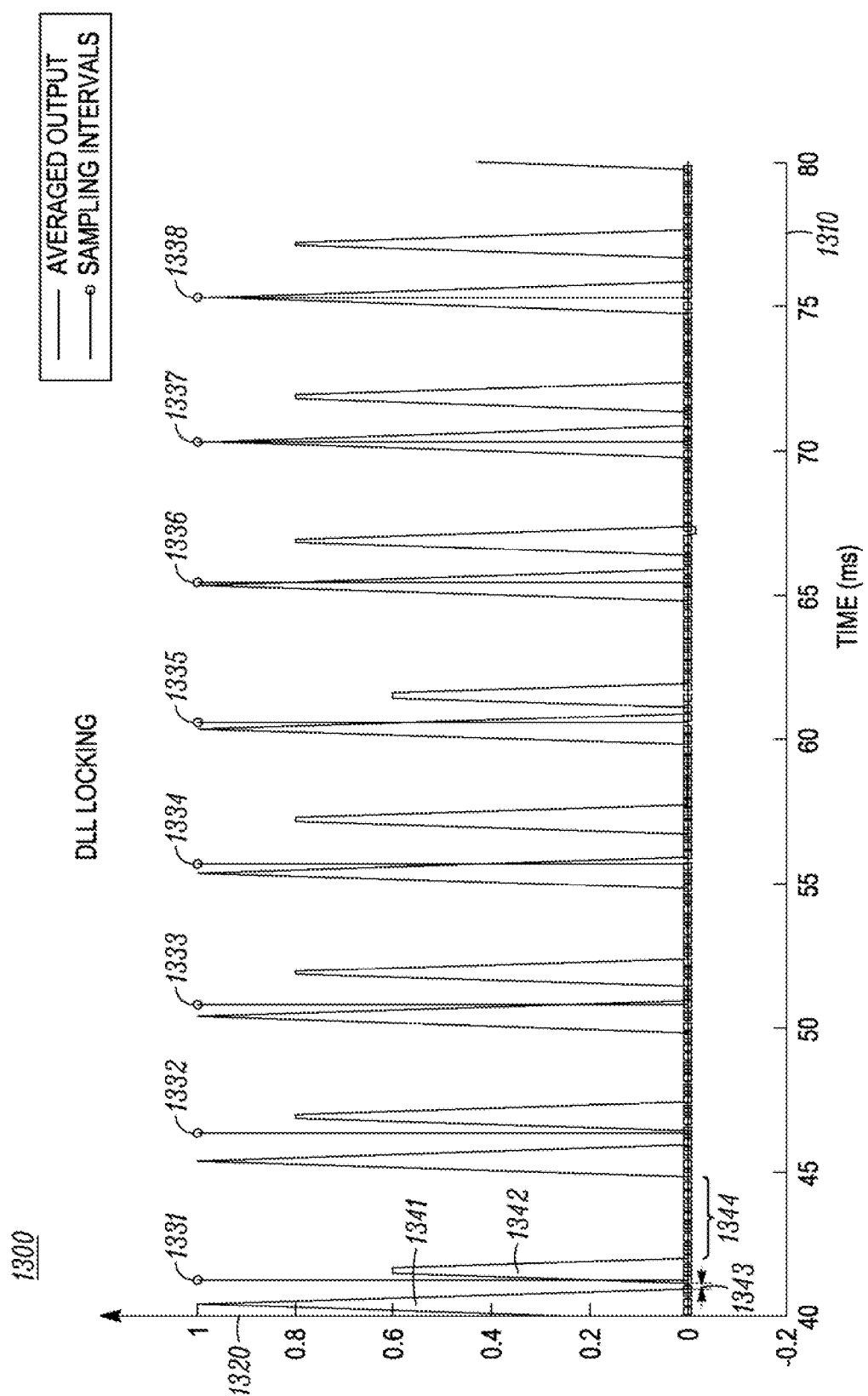
FIG. 13 shows a diagram of a DLL process gradually locking onto MAP symbols.

FIG. 13 shows a diagram 1300 of a DLL process gradually locking onto MAP symbols. The x-axis 1310 shows milliseconds and the y-axis 1320 shows amplitude. Because the RXE signal and the matched filter in (or sometimes considered as preceding) the DLL both contain simple rectangular pulses, the convolution creates triangle peaks 1341, 1342 that are separated by zero intervals 1343, 1344. Zeros of the slope of the convolution graph occur either at the peak of a triangle or during the zero intervals between triangles. Three samples taken around a preliminary MAP period $T_{MAP}$ ($x_1$ being early, $x_2$ being on-time, and $x_3$ being late) can be used iteratively adjust the MAP period $T_{MAP}$ to find the MAP frequency.

For each set of three samples, the slopes between the samples are analyzed to determine whether to extend or decrease the MAP period for the next three samples to be taken around the new MAP period. For example, at the first sampling point 1331 shown, three samples are taken. Because the graph is rising around sampling point 1331, the MAP period is lengthened, and the next sampling point 1332 is the lengthened MAP period away from the previous sampling point 1331. Around sampling point 1332, the slopes are all zero because the sampling point 1332 is in a zero interval between triangles. Then the MAP period is changed again because the DLL has not found a maximum of the convolution. The next sampling point 1333 results in negative slopes among the three-sample set, indicating that the MAP period should be shortened. The MAP period is successively shortened, resulting in sampling points 1334, 1335, 1336 which draw closer and closer to the peaks of the convolution graph. When the sampling point 1337 is reached, the samples on either side of point 1337 have a positive slope followed by a negative slope, indicating at least a local extremum.

Note that this diagram 1300 reflects an RXE signal 252 (FIG. 2 and FIG. 3) containing both a MAP symbol at peak 1431 and a downlink data symbol at peak 1342. Because the MAP symbol corresponds exactly to the matched filter, the amplitude of the MAP symbol peak 1341 is 1. Meanwhile, the downlink data symbol does not correspond exactly to the matched filter and so the amplitude of the peak 1342 is less than 1. Although the example here is fairly simple, note that the downlink data symbol is not as consistent as the MAP symbol in either time or magnitude; thus any temporary lock on a downlink data peak 1342 will eventually be overcome by future iterations the DLL.

As stated previously, a sample value of 1 (or close to 1), with equal values that are less than 1 immediately before and after the on-time sample $x_2$, indicates that a portion of the RXE signal matches exactly with the expected MAP symbol represented by the matched filter and provides an indication that the MAP symbol in the RXE signal has been located. The MAP period is kept stable now and the last sample shown, at point 1338 (taken with a MAP period equal to the preceding MAP period used to find point 1337), also has a value of 1 which indicates that the DLL has locked onto a $T_{MAP}$ that accurately reflects the timing of the MAP symbol within the RXE signal.

Figure 14:
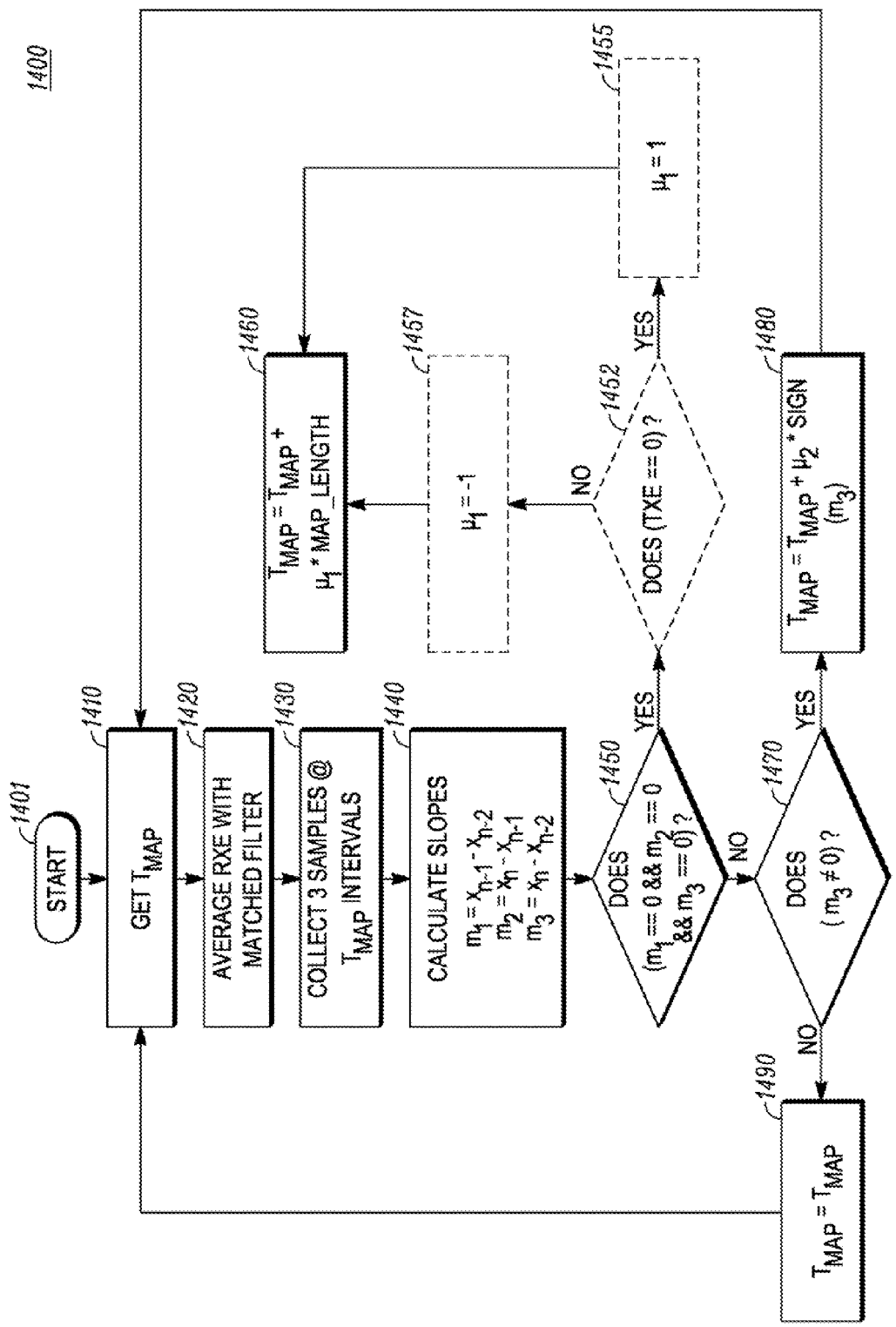
FIG. 14 provides a flow diagram for operation of a DLL block within an observer unit of a co-existence predictor as shown in FIG. 3.

FIG. 14 provides a flow diagram 1400 for operation of a DLL block 325 within an observer unit 320 of a co-existence predictor 300 as shown in FIG. 3. This flow diagram 1400 can be situated within step 420 of FIG. 4 as being another additional or alternate method for detecting a MAP symbol.

After the start step 1401, step 1410 obtains an initial expected MAP symbol periodicity $T_{MAP}$, which is the inverse of the frequency of an expected MAP symbol. This expected MAP symbol periodicity $T_{MAP}$ can be selected from one or more expected MAP symbol periodicity values stored within the mobile station 110 (FIG. 1) based on one or more factors such as: historical frequency of success by the mobile station 110 in detecting MAP symbols using a particular expected MAP symbol periodicity, a preset order for using expected MAP symbol periodicity values, knowledge of the type of OFDMA link currently active (e.g., VoIP, internet, etc.), and/or FFT analysis. For example, because most WiMAX frames are 5 milliseconds in length, selecting an initial $T_{MAP}$ of 5 milliseconds is reasonable. In step 1420, the expected MAP symbol is fed into an averaging matched filter (MF) of a DLL (sometimes an MF is considered as "preceding" a DLL rather than being part of the DLL), and the DLL will convolve the expected MAP symbol and the observed RXE signal to produce triangle peaks.

Step 1430 samples three points at $T_{MAP}$ intervals ($x_1$ being early, $x_2$ being on-time, and $x_3$ being late) from the output of the DLL averaging filter. Assuming the output of the averaging filter provides extremum when elements of the RXE signal have the same duration and periodicity as the expected MAP symbol, sampling at three nearby points and comparing the slopes between those three points will adjust the MAP period to lock onto the MAP symbol. Step 1440 calculates the slopes between the each of the three points. Slope $m_1=x_{n-1}-x_{n-2}$; slope $m_2=x_n-x_{n-1}$; and slope $m_3=x_n-x_{n-2}$. If all three slopes $m_1$, $m_2$, and $m_3$ are zero as determined by step 1450, then the samples are presumed to be at a minimum between triangles (see FIG. 13 zero intervals 1343, 1344) and thus the $T_{MAP}$ will be adjusted by a larger value MAP_Length in step 1460. In this embodiment, MAP_Length represents the duration of the hypothetical MAP symbol.

Optional steps 1452, 1455, 1457 examine the TXE signal 257 (FIG. 2 and FIG. 3) and determine whether $T_{MAP}$ should be increased by MAP_Length or decreased by MAP_Length. If the TXE signal is active as determined by step 1452 (NO branch), then a MAP symbol will be expected soon. (This is because a WiMAX frame has a MAP message followed by downlink sub-frames and then uplink sub-frames. Thus, uplink data will be followed by a MAP message. See FIG. 2.) Because a MAP symbol is expected soon, step 1457 causes step 1460 to decrease the MAP interval by the MAP_Length value. If the TXE signal is not active, step 1455 causes step 1460 to increase the MAP interval by the MAP_Length.

If one of the three slopes from step 1440 is non-zero (as determined by step 1450), then step 1470 determines if $m_3$ does not equal zero. If $m_3$ does not equal zero, this indicates that there is an overall slope within the three samples and the MAP interval is gradually increased or decreased depending on the sign of the overall slope $m_3$ using step 1480. Generally speaking, the change in the MAP interval produced by step 1480 is slight (e.g., $\mu_2$ represents one sampling interval) when the change in the MAP interval produced by step 1460 is greater (e.g., MAP_Length represents more than one sampling interval).

If the overall slope $m_3$ is zero as determined by step 1470 (NO branch), then the three samples are straddling a local extremum and step 1490 maintains the same MAP interval for the next iteration through the flow diagram 1400. If the extremum found is not the global maximum, then it results from a downlink OFDMA data symbol. Because downlink OFDMA data symbols are not as periodic as MAP symbols, the consistent $T_{MAP}$ will eventually fail to produce an indicator of a local maximum (i.e., either step 1450 will result in a YES decision or step 1470 will result in a YES decision) and the DLL will proceed to find another local maximum.

Thus are described four methods of determining frequency, phase, and/or duration of a hypothetical MAP symbol within an RXE signal. Some of these methods make use of expected MAP symbol patterns (e.g., covariance techniques and delay-locked loop techniques) while others do not (e.g., RXE signal transition observation and FFT analysis). Some methods find frequency and phase of a hypothetical MAP symbol (e.g., FFT analysis and delay locked loop analysis), while other methods can estimate duration of a MAP symbol as well as frequency and phase (e.g., covariance analysis and transition analysis). Because each of the methods can be varied differently depending on the constraints of the OFDMA communication technology being used and because each of the methods has different processor and power consumption requirements, portions of these methods (and/or their variants) can be used alternately or cumulatively.

Returning to FIG. 3, the MAP symbol duration and/or MAP symbol periodicity (frequency and phase) outputs of the observer unit 320 are used as inputs to the estimator unit 350 to generate a MAP' signal (estimating the timing and duration of future MAP symbols).

The DLU 370 uses the MAP' signal, plus the actual RXE signal from the OFDMA transceiver 117, to control shutdown of the Bluetooth transmitter within Bluetooth transceiver 115 (or any other transmitter, such as a WiFi transmitter, that has potential contention issues).

Figure 15:
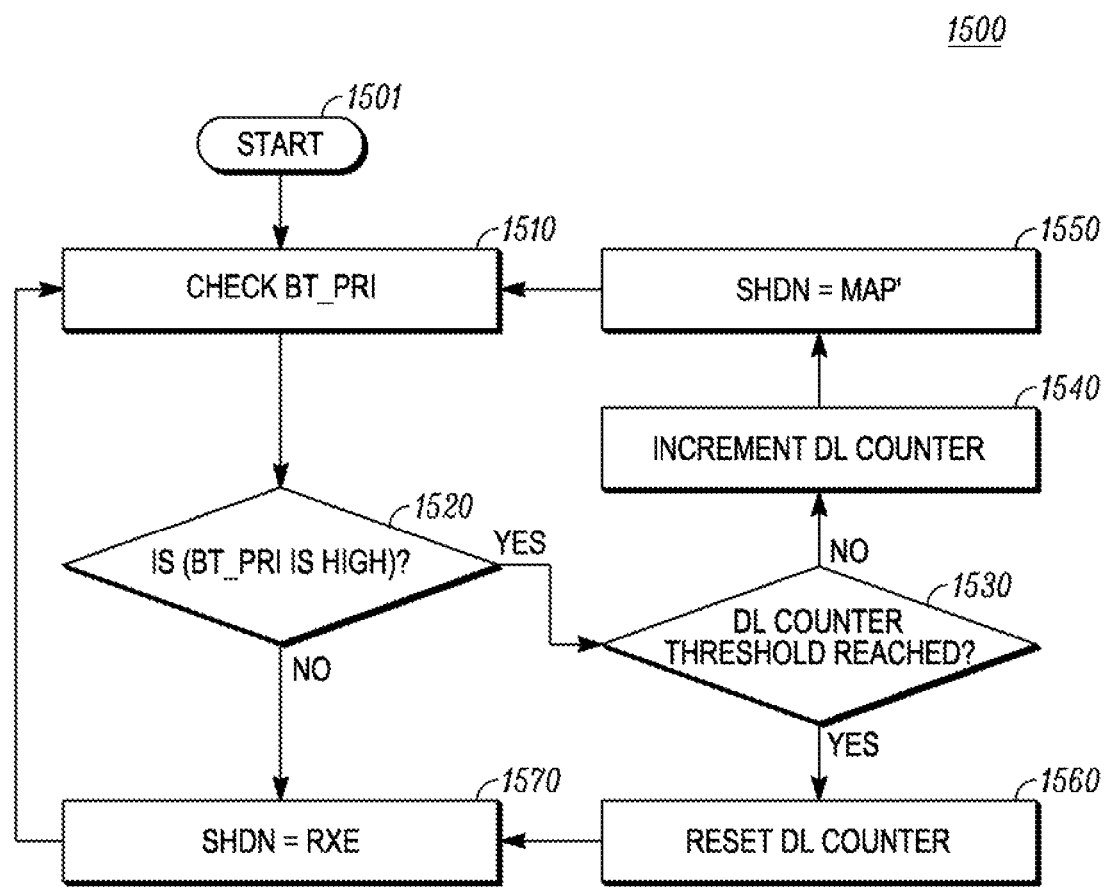
FIG. 15 shows a flow diagram that can be implemented in the Decision Logic Unit (DLU) of the co-existence predictor of FIG. 3.

FIG. 15 shows a flow diagram 1500 that can be implemented in the DLU 370 of the co-existence predictor 300 of FIG. 3. The DLU 370 operates to protect the OFMDA receiver 117 (FIG. 1) and shuts down the co-located Bluetooth transmitter 115 whenever MAP messages are expected as indicated by the MAP' signal from the estimator unit 350. Also, when an active OFDMA downlink symbol is expected, the DLU 370 prioritizes the OFDMA receiver over the Bluetooth transmitter unless the Bluetooth transmitter has a high priority signal. If, however, the Bluetooth priority signal has been high for a predetermined amount of time, the OFDMA receiver is temporarily prioritized so that at least some incoming OFDMA data can be received. This prioritization logic allows the OFDMA transceiver 117 to coexist with a Bluetooth transceiver 115 operating in the same mobile station 110 at the same or similar frequency band while maintaining synchronization. This logic also strikes a particular balance between the relative priorities of a Bluetooth uplink frame and an OFDMA downlink data frame. Of course, other balances may be desired and achieved using the basic principles shown. It should be noted that if there were long periods of inactivity on the WiMAX link concurrent with a high priority Bluetooth SCO connection, it may be desirable to finish any Bluetooth transmission currently in process at the expense of corrupting the first new MAP message. In this situation, a small sacrifice is made on the WiMAX connection in order to maintain the high quality Bluetooth audio link.

After starting in step 1501, the DLU checks whether a Bluetooth priority signal BT_PRI is active in step 1510. If the BT_PRI signal is active as determined by step 1520, the DLU checks whether a downlink counter has reached a threshold in step 1530, increments the downlink counter in step 1540 if the threshold has not been reached, and couples the MAP' signal to the BT_SHDN pin in step 1550 so that Bluetooth communication is only interrupted when MAP messages are expected. If a Bluetooth transmission is halted, the data will be lost if it is using an SCO connection. (If the Bluetooth transceiver is using a fast ARQ mechanism, it will be retransmitted at the next available timeslot.)

If the BT_PRI signal remains high for the threshold number of frames, step 1530 will determine that the downlink counter threshold has been reached, step 1560 will reset the downlink counter, and the RXE signal is coupled to the BT_SHDN pin in step 1570 even if the BT_PRI signal is still active. Thus, the DLU 370 will always prefer the reception of expected MAP messages over Bluetooth operation, will prefer Bluetooth operation over the reception of WiMAX downlink data for a limited number of WiMAX frames when the BT_PRI signal is active, and will prefer the reception of WiMAX downlink data over Bluetooth operation when the BT_PRI signal is not active or when the BT_PRI signal has exceeded the limited number of WiMAX frames.

Note that the BT_PRI signal is configurable and the BT_PRI signal for Bluetooth/WiMAX co-existence can differ from its definition for Bluetooth/WLAN co-existence.

If step 1520 determines that the Bluetooth priority signal BT_PRI is not active, the DLU 370 couples the RXE signal to the BT_SHDN pin in step 1570 to protect all WiMAX downlink traffic as well as the MAP messages.

Thus, the method and apparatus for coexistence reduces internal interference between a Bluetooth transmitter and an OFDMA receiver both operating at (or near) a single frequency band in a single mobile station. Coexistence is promoted by protecting MAP messages and balancing the relative priorities of receiving OFDMA downlink data symbols and transmitting Bluetooth timeslots. A signal indicating expected MAP message receipt can be directly generated by an OFDMA transceiver or an RXE signal can be analyzed by a co-existence predictor to determine expected MAP message receipt times.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, the mobile station 110 includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method for coexistence of an orthogonal frequency division multiple access (OFDMA) receiver with a synchronous frame-based transmitter within a mobile station comprising:
   receiving an estimated media access protocol (MAP') signal indicating when a media access protocol (MAP) message is expected to be received by the OFDMA receiver;
   sending the MAP' signal to the synchronous frame-based transmitter to shut down the synchronous frame-based transmitter when a MAP message is expected to be received;
   receiving an OFMDA receiver-enable (RXE) signal indicating when a MAP message is expected to be received by the OFDMA receiver and also indicating when downlink data is expected to be received by the OFDMA receiver; detecting the MAP symbol within the RXE signal; and
   producing the MAP' signal.

2. The method according to claim 1 wherein the MAP' signal is a MAP indicator signal from the OFDMA receiver.

3. The method according to claim 1 wherein detecting comprises:
   determining a frequency of the MAP symbol;
   observing a phase of the MAP symbol; and
   finding a duration of the MAP symbol.

4. The method according to claim 3 wherein the determining a frequency of the MAP symbol comprises:
   waiting for a transmitter-enable (TXE) signal to be low;

sampling transitions of the RXE signal going from high-to-low for a predetermined observation period of time;

finding lengths of time between transitions;

determining a period of the MAP symbol ($T_{MAP}$) to be a statistical mode of the lengths of time between transitions.

5. The method according to claim 3 wherein the determining a frequency of the MAP symbol and observing a phase of the MAP symbol comprises:

taking a Fast Fourier Transform of samples of the RXE signal; and setting the frequency of the MAP symbol and the phase of the MAP symbol to be at a maximum non-DC term of the Fast Fourier Transform.

6. The method according to claim 3 wherein the determining a phase of the MAP symbol comprises:

computing a cross-correlation between the RXE signal and an expected MAP pattern; and setting the phase of the MAP symbol to be when a derivative of the cross-correlation changes from a positive value to a non-positive value.

7. The method according to claim 6 wherein the finding a duration of a MAP symbol comprises:

mapping a highest value of the cross-correlation to a percentage of a duration of a MAP symbol in the expected MAP pattern.

8. The method according to claim 3 wherein the determining a frequency of the MAP symbol and observing a phase of the MAP symbol comprises:

convolving the RXE signal with an expected MAP symbol to produce a convolution result;

analyzing slopes of at least three samples of the convolution result taken around a MAP interval and adjusting the MAP interval based on the slopes; and repeating the analyzing until the MAP interval locates a maximum of the convolution result.

9. The method according to claim 3 wherein the finding a duration of a MAP symbol comprises:

measuring a duration of a high RXE signal at the frequency of the MAP symbol and the phase of the MAP symbol.

10. The method according to claim 3 wherein producing comprises:

creating a MAP' signal having the determined frequency of the MAP symbol, the observed phase of the MAP symbol, and the found duration of the MAP symbol.

11. The method according to claim 1 wherein sending comprises:

determining that the synchronous frame-based transmitter is not transmitting a priority frame and sending the RXE signal to the synchronous frame-based transmitter to shut down the synchronous frame-based transmitter when a MAP message is expected to be received and when downlink data is expected to be received.

12. A co-existence predictor comprising:

an observer unit for observing a receiver-enable (RXE) signal from a first transceiver operating at a frequency band and determining a frequency, duration, and phase of a media access protocol (MAP) symbol within the RXE signal;

an estimator unit for producing an estimated media access protocol (MAP') signal from the frequency, duration, and phase of the MAP symbol; and a decision logic unit for producing a shut down signal to shut down a transmitter of a co-located second transceiver operating near the frequency band when the MAP' signal is active.

13. The co-existence predictor according to claim 12 wherein the observer unit comprises:

a microcontroller unit with programmable timers for determining the frequency of the MAP symbol and the phase of the MAP symbol.

14. The co-existence predictor according to claim 12 wherein the observer unit comprises:

a Fast Fourier Transform block for determining the frequency of the MAP symbol and the phase of the MAP symbol.

15. The co-existence predictor according to claim 12 wherein the observer unit comprises:

a delay-locked loop for determining the frequency of the MAP symbol and the phase of the MAP symbol.

16. The co-existence predictor according to claim 12 wherein the observer unit comprises:

a covariance block for determining the phase of the MAP symbol.

17. The co-existence predictor according to claim 12 wherein the frequency is a predetermined value.

18. The co-existence predictor according to claim 12 wherein the duration is a predetermined value.

19. The co-existence predictor according to claim 12 wherein the decision logic unit comprises:

a priority signal input for receiving an active priority signal when the transmitter is transmitting a priority frame.

20. The co-existence predictor according to claim 12 wherein the shut down signal shut is active when the RXE signal is active.

* * * * *